(12) United States Patent
Tan et al.

(10) Patent No.: US 7,231,544 B2
(45) Date of Patent: Jun. 12, 2007

(54) RESTORING DATA FROM POINT-IN-TIME REPRESENTATIONS OF THE DATA

(75) Inventors: Choon-Seng Tan, Houston, TX (US); Greg J. Pellegrino, Tomball, TX (US); Balaji Natrajan, Houston, TX (US); Brian J. Corell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 10/376,957

(22) Filed: Feb. 27, 2003

(65) Prior Publication Data

US 2004/0172577 A1 Sep. 2, 2004

(51) Int. Cl.
G06F 11/00 (2006.01)

(52) U.S. Cl. .......................... 714/15; 714/20

(58) Field of Classification Search ................ 714/15, 714/20
See application file for complete search history.

(56) References Cited

U.S. PATENT DOCUMENTS

| | | | |
|---|---|---|---|
| 5,481,694 A * | 1/1996 | Chao et al. ................. 711/112 |
| 5,544,347 A * | 8/1996 | Yanai et al. ................. 711/162 |
| 6,044,475 A * | 3/2000 | Chung et al. ................. 714/15 |
| 6,058,489 A | 5/2000 | Schultz et al. |
| 6,182,198 B1 | 1/2001 | Hubis et al. |
| 6,212,531 B1 | 4/2001 | Blea et al. |
| 6,269,453 B1 | 7/2001 | Krantz |
| 6,418,539 B1 | 7/2002 | Walker |
| 6,430,702 B1 | 8/2002 | Santeler et al. |
| 6,505,268 B1 | 1/2003 | Schultz et al. |
| 6,510,500 B2 | 1/2003 | Sarkar |
| 6,594,744 B1 * | 7/2003 | Humlicek et al. .......... 711/162 |
| 6,651,075 B1 * | 11/2003 | Kusters et al. .............. 707/204 |
| 6,771,843 B1 * | 8/2004 | Huber et al. ................. 382/305 |
| 6,948,089 B2 * | 9/2005 | Fujibayashi .................... 714/6 |
| 2002/0083366 A1 * | 6/2002 | Ohran ......................... 714/13 |
| 2003/0149736 A1 * | 8/2003 | Berkowitz et al. .......... 709/213 |

* cited by examiner

Primary Examiner—Bryce P. Bonzo

(57) ABSTRACT

A system includes a controller to store point-in-time representations (or snapshots) of data taken at different time points from storage unit of a storage subsystem. Data can be restored from one of the point-in-time representations, with point-in-time representations taken later than the one point-in-time representation maintained enabled to allow a subsequent restoring of data from the later point-in-time representations.

22 Claims, 5 Drawing Sheets

RESTORING DATA FROM POINT-IN-TIME REPRESENTATIONS OF THE DATA

BACKGROUND

With advancement in storage technology, the amount of data that can be stored in storage subsystems, which include hard disk drives, disk array systems, and so forth, has increased dramatically. However, one of the issues associated with storage subsystems is the possibility of failure, which may result in loss of data. To address the risk of data loss, various types of data recovery techniques have been implemented. One type of recovery technique uses tape backup, in which data on a disk storage subsystem is backed up to a tape on a periodic basis. Should the disk storage subsystem fail, then data can be recovered from the tape.

A fault tolerant storage subsystem, such as a RAID (Redundant Array of Inexpensive Disks) subsystem, can also be used to avoid data loss. There are several RAID levels, with RAID level 1 using mirroring to provide fault tolerance, and other RAID levels (e.g., RAID level 4 or 5) using parity to enable the recovery of data.

Another data recovery technique involves the taking of "snapshots" of data, with a snapshot being a copy of data in a "storage unit" taken at a particular time. A "storage unit" refers to a logical unit of data (e.g., a volume) in a storage subsystem. A snapshot of data is also referred to as a point-in-time representation of data. If recovery of data is desired, the storage unit can be restored to a prior state by copying data from a snapshot back into the storage unit.

Multiple snapshots of data stored in a storage unit can be taken at different times. In conventional storage subsystems, once data in a snapshot is restored back to the storage unit, any newer snapshots (that is, snapshots that are more recent than the snapshot used to restore data) are invalidated or disabled because data in such snapshots are no longer coherent or valid. The invalidated or disabled snapshots can no longer be used for subsequent recovery operations, which reduces flexibility in recovering from snapshots. For example, once a user restores data from a given snapshot, the user typically loses the ability to restore data from more recent snapshots.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
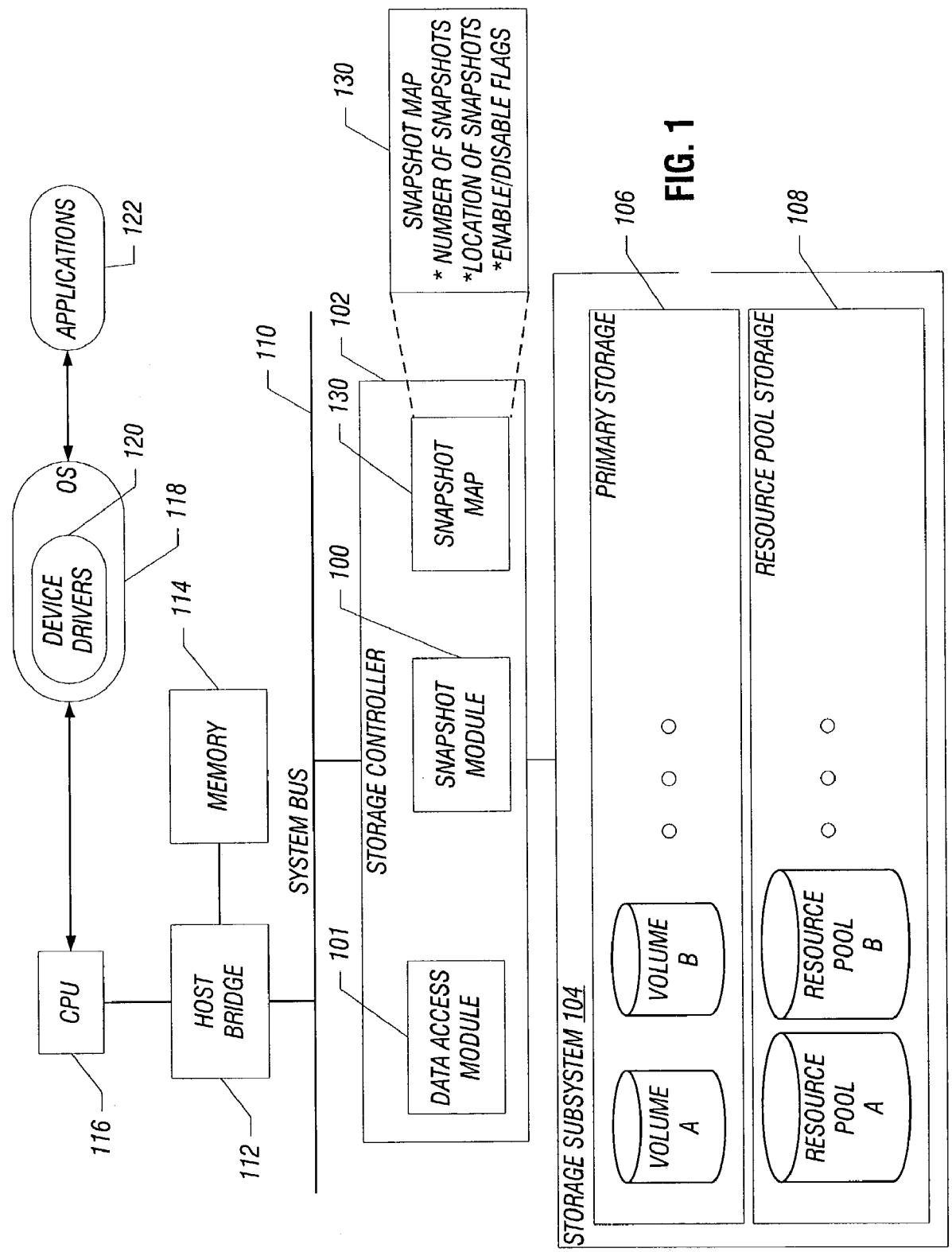
FIG. 1 is a block diagram of an example computer system that implements a snapshot mechanism according to one embodiment.

FIG. 1 is a block diagram of an example computer system that implements a snapshot mechanism according to an embodiment. The snapshot mechanism includes a snapshot module 100 that is implemented in a storage controller 102. In one implementation, the storage controller is an integrated circuit device, and the snapshot module 100 is firmware that is executable by the storage controller 102. In other embodiments, the snapshot module 100 can be implemented entirely in hardware, or in software executable on a processor or controller.

In one example, the storage controller 102 is a RAID (Redundant Array of Inexpensive Disks) controller to provide fault tolerance. However, in alternative embodiments, other types of storage controllers can be used in the system of FIG. 1.

The storage controller 102 is coupled to a storage subsystem 104, which includes a primary storage 106 and a resource pool storage 108. The primary storage 106 is the normal storage used by the system for storing data. The resource pool storage 108 contains snapshots of data stored in the primary storage 106. In one embodiment, the storage subsystem 104 is implemented with multiple storage devices, such as hard disk drives. For improved fault tolerance, the primary storage 106 can be implemented in a first set of storage devices, while the resource pool storage 108 is implemented on another set of storage devices. The storage controller includes a data access module 101 to manage the retrieval of data and the writing of data to the storage subsystem 104. Although only one storage controller 102 is shown, multiple storage controllers can be used in other embodiments.

As used here, a "snapshot" refers to a point-in-time representation of a logical storage unit in the primary storage 106. In the system shown in FIG. 1, the primary storage 106 is divided into multiple logical storage units, referred to as volumes, including volume A, volume B, and so forth. Each volume in the primary storage 106 is associated with a respective resource pool in the resource pool storage 108. Thus, in the example shown in FIG. 1, volume A is associated with resource pool A, volume B is associated with resource pool B, and so forth. Multiple snapshots taken at different times can be stored in each resource pool for a respective volume. Thus, for example, multiple snapshots of data in volume A taken at different times are stored in resource pool A. To restore data, the snapshots stored in resource pool A can be used to restore data back into volume A.

The snapshot mechanism according to some embodiments enables a user to undo a restore from a given snapshot. To provide this feature, snapshots taken after the given snapshot are maintained enabled so that a user can choose to restore from one of the later (more recent) snapshots. For example, for a given volume, assume snapshots S1, S2, and S3 are taken at time points t1, t2, and t3, respectively. A user may decide initially to restore from snapshot S1. After the restore from snapshot S1, snapshots S2 and S3 remain enabled. If the user determines that snapshot S1 does not contain the desired data, the user can subsequently perform a restore from snapshots S2 and S3. Also, to enable the undo of all restores, the content of the source volume is copied to the most recent (or current) snapshot prior to restoring from snapshot S1. This enables the user to restore the source volume to its original state prior to any restore operation.

As further shown in FIG. 1, the storage controller 102 is coupled to a system bus 110, which is in turn coupled to other bus components, such as a host bridge 112. The host bridge 112 is coupled to system memory 114 and to a central processing unit (CPU) 116. In addition to the hardware components shown, software components are also part of the system. One such software component is the operating system (OS) 118, which includes various device drivers 120 to enable communication between higher-level software components (such as software applications 122) and hardware components of the system. A system typically includes other components, which are not shown in FIG. 1. Also, the arrangement of FIG. 1 is provided by way of example only, as other systems can have other arrangements.

One or more snapshot maps 130 are maintained to track the snapshots stored in the resource pool storage 108. In the example of FIG. 1, the snapshot map 130 is stored in a storage device in the storage controller 102. However, in other embodiments, the snapshot map 130 may be stored in the system memory 114, in the storage subsystem 104, or elsewhere.

One snapshot map 130 may be maintained for each volume. Thus, for example, volume A and resource pool A are associated with a first snapshot map; volume B and resource pool B are associated with a second snapshot map; and so forth. Alternatively, one snapshot map 130 maintains information for multiple volumes.

The snapshot map 130 contains information to indicate the number of snapshots taken for each volume. Also, for each snapshot, the location of the snapshot in the storage subsystem 104 is identified in the snapshot map 130. In addition, the snapshot map 130 contains an indicator for each snapshot to indicate whether the snapshot is enabled or disabled. The indicator can be a flag set to an enabled state or a disabled state.

The snapshot module 100 accesses the information contained in the snapshot map 130 to take snapshots and to perform restore operations. Also, as new snapshots are created, new entries are added to the snapshot map 130 to store information pertaining to the new snapshots.

According to one embodiment, a copy-on-write technique is used to take a snapshot. On each write to a logical storage unit of data (e.g., a volume), before the write is executed, the block or blocks of the logical storage unit of data that are about to be changed are written to the snapshot taken at time t. After the snapshot is taken, the data write is performed to the logical storage unit. Thus, the snapshot taken at time t stores the data blocks that were changed at time t.

Figure 2:
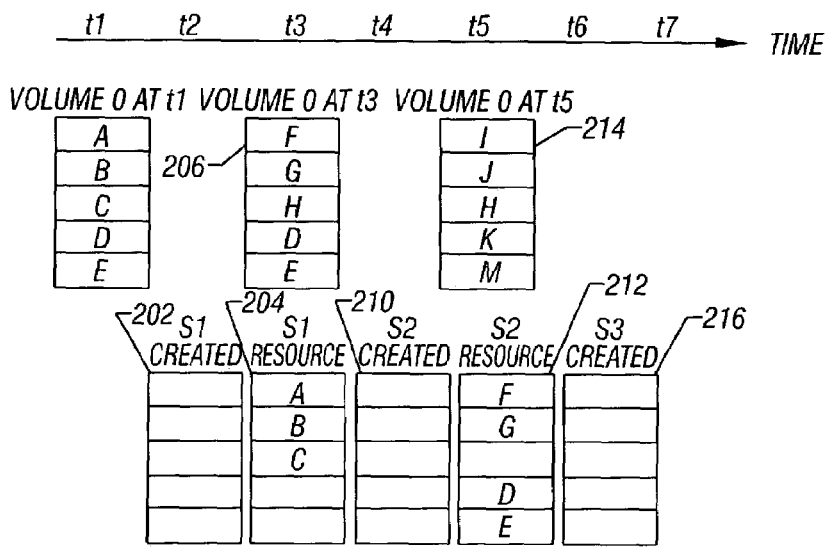
FIG. 2 illustrates an example process of creating and taking snapshots of data in a logical storage unit.

An example is illustrated in FIG. 2, in which volume 0 has five blocks. Originally, at time t1, volume 0 has blocks A, B, C, D, and E. The snapshot feature can be automatically enabled upon system start-up, or it can be enabled in response to a command (such as a command from the user or a peripheral device). If the snapshot feature is enabled, a first snapshot (S1) is created, as indicated by 202. At time t3, a data write is requested (to replace blocks A, B, C with blocks F, G, H in volume 0). Prior to writing data into volume 0, blocks A, B, and C from volume 0 are copied to snapshot S1 (indicated at 204). After the write to the snapshot S1, blocks A, B, and C in volume 0 are replaced with blocks F, G, and H (indicated at 206). Thus, snapshot S1 contains the changed data in volume 0 at time t3; snapshot S1 does not contain unchanged blocks D and E.

At time t4, another snapshot S2 is created (at 210). Assume another write is requested at time t5. This second write calls for blocks F, G, D, and E to be replaced with blocks I, J, K, and M, respectively. The changed blocks are written to snapshot S2 (indicated at 212), followed by the overwriting of blocks F, G, D, and E with I, J, K, and M in volume 0 (at 214). Thus, snapshot S2 stores the blocks that changed at time t5. Snapshot S3 (indicated at 216) is created at time t6.

More generally, a snapshot (or point-in-time representation) of data is a copy of data in a logical storage unit, with the snapshot containing the difference between the current state of the logical storage unit and the state of the logical storage unit at the time the snapshot was taken. A snapshot usually inherits all properties of the source logical storage unit, such as the block structure of the source logical storage unit. Thus, as illustrated in the example of FIG. 2, each snapshot contains the same block sizes as the source logical storage unit, as well as the same number of blocks.

Another characteristic of a snapshot that exists in some implementations is that the snapshot can be masked or un-masked from the operating system 118. If masked, the operating system 118 does not see the snapshot. However, if un-masked, the operating system 118 sees the snapshot as another logical storage volume that the operating system can access. In fact, the snapshot can be made visible to the operating system 118 as soon as the snapshot is created. When un-masked, the system is able to directly read from or write to the snapshot. In other words, the system does not need to restore the snapshot first to the source logical volume before the system is able to access data contained in the snapshot.

According to some embodiments of the invention, a dual-direction restore option is provided. The dual-direction restore option is contrasted from a single-direction restore option. In the single-direction restore option, when a restore is performed from a snapshot to a given volume, the data contained in later (more recent) snapshots become obsolete. As a result, the system invalidates or disables the more recent snapshots. Thus, once the restore operation is completed, an "undo" cannot be performed to undo the restore operation. In other words, if the single-direction restore operation is used, the user is "stuck" with the restore.

However, the dual-direction restore option according to some embodiments allows an undo of a restore from an older snapshot. With the dual-direction restore option, after a restore from a snapshot, newer snapshots are not disabled or invalidated. In one embodiment, this is achieved by copying data from the source volume to the currently active snapshot before the restore operation is performed. As a result, the currently active snapshot contains a state of the logical storage unit prior to the restore operation, and thus contains the "undo information" to allow the system to undo a restore operation. This provides greater flexibility to a user in that if a restore from a particular snapshot is not one that the user desires, the user can undo the restore and perform another restore from another, more recent snapshot. For example, if a user learns that a snapshot from time t1 was not what the user wanted, the user can undo the restore and perform another restore from a snapshot taken at time t2 (which is newer than the snapshot at time t1).

To provide further flexibility in accordance with some embodiments of the invention, the user can select either the dual-direction restore option or the single-direction restore option. This selection may be made by selecting an option provided in a user interface of the system, such as a graphical user interface provided by a software application, BIOS (basic input/output system) code, and so forth.

Figure 3:
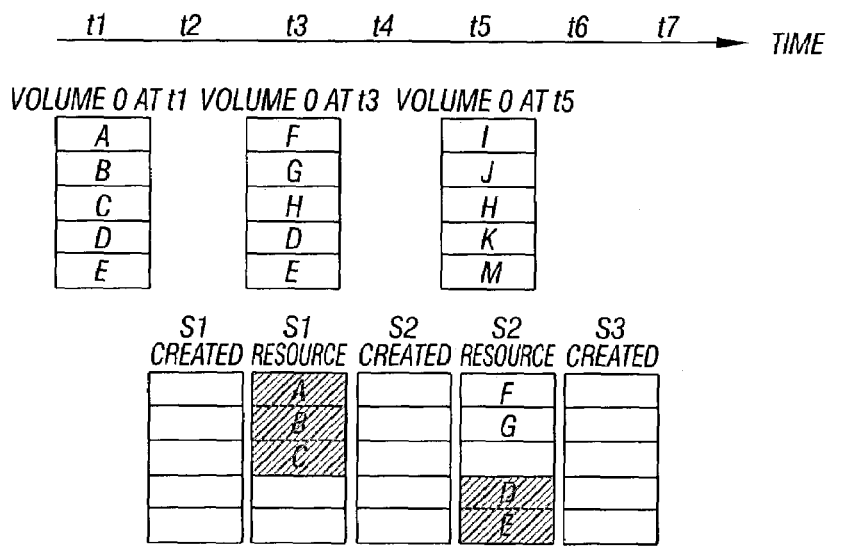
FIGS. 3-5 illustrate an example process of restoring from a snapshot using a single-direction restore option.
Figure 4:
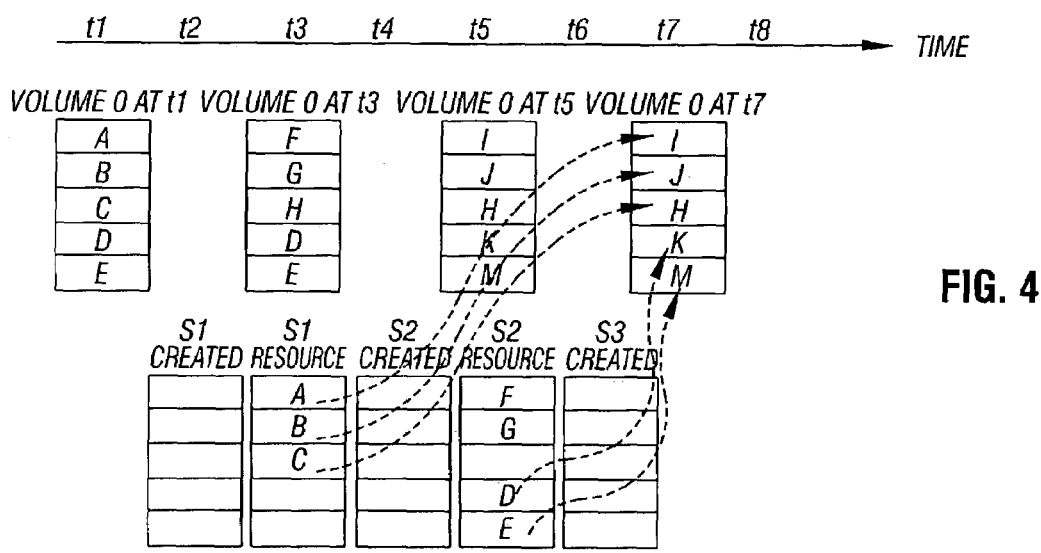

FIGS. 3 and 4 illustrate a process of performing a single-direction restore. Assume at time t6, volume 0 and resource pool 0 are as illustrated in FIG. 2. At time t6, a request is received by the system to restore volume 0 from snapshot S1. In response to such a request, the snapshot module 100 in the storage controller 102 (FIG. 1) performs a data search in the resource pool to find valid data blocks to copy back to the original volume. The searching algorithm begins with snapshot S1, and proceeds forward to the resource pool of newer snapshots to find further valid data (in this case snapshot S2). Snapshot S1 contains the first three blocks (A, B, and C), whereas snapshot S2 contains the fourth and fifth blocks (D and E) of volume 0. The data blocks that are identified are highlighted in FIG. 3. The five blocks (A, B, C, D, and E) represent the valid data in volume 0 at the time snapshot S1 was taken. Note that since blocks D and E were not changed with the write that occurred at time t3, later snapshots have to be examined by the snapshot module 100 to find these blocks. Although blocks D and E were found in snapshot S2 in the example, they would have been in later snapshots if blocks D and E had remained unchanged for a longer period of time.

Next, as shown in FIG. 4, the blocks that have been identified are copied to volume 0 at time t7. In this restore operation, block A replaces block I in volume 0, block B replaces block J, block C replaces block H, block D replaces block K, and block E replaces block M. After this restore, all snapshots newer than snapshot S1 are marked disabled (by updating the snapshot map 130 in FIG. 1). In the example shown in FIG. 4, the newer snapshots are snapshots S2 and S3.

Alternatively, instead of performing single-direction restore, the system can perform dual-direction restore if the option is selected within the system. This may be indicated by setting a flag that is accessible by the snapshot module 100. A first value of this flag indicate single-direction restore, while a second value of this flag indicates a dual-direction restore.

Figure 5:
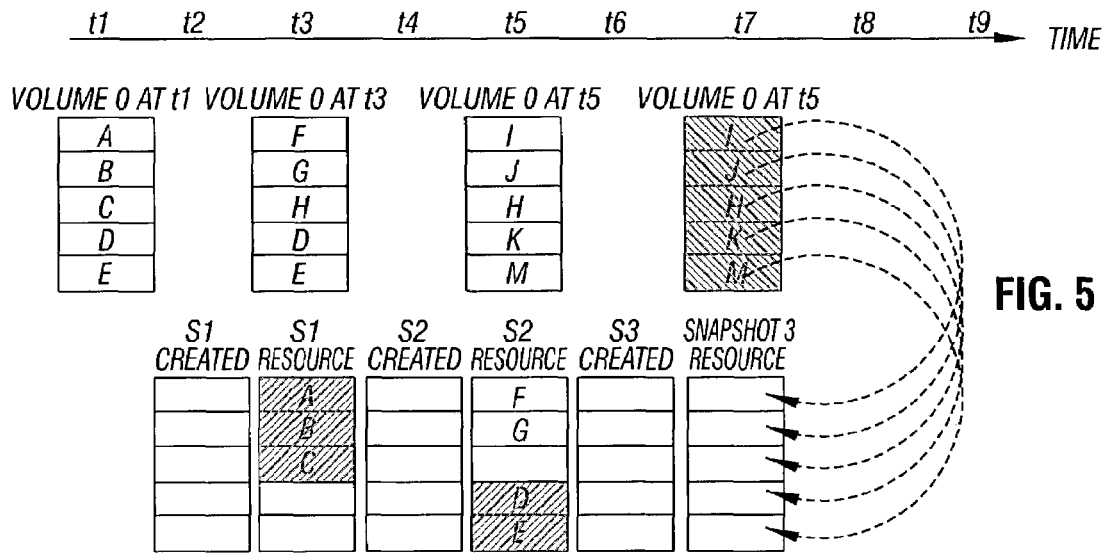

As in the case of single-direction restore, in response to a request to perform the restore from snapshot S1, the snapshot module 100 searches for valid data in snapshot S1 and any subsequent snapshots, as illustrated in FIG. 3. However, with the dual-direction in restore operation, the restore is not performed immediately in response to the restore request. Instead, the restore request is treated like any other write to volume 0—that is, a copy-on-write operation is performed to copy changed or affected data in volume 0 to the currently active snapshot. This is illustrated in FIG. 5. The blocks of volume 0 are copied to snapshot S3, which is the currently active snapshot. As another example, if snapshot S3 did not exist, then data in source volume 0 is copied to snapshot S2 prior to the restore operation. Note that it is not necessarily the entire volume 0 that is copied—only the changed or affected data blocks that have not been previously copied to the most current snapshot are copied.

Figure 6:
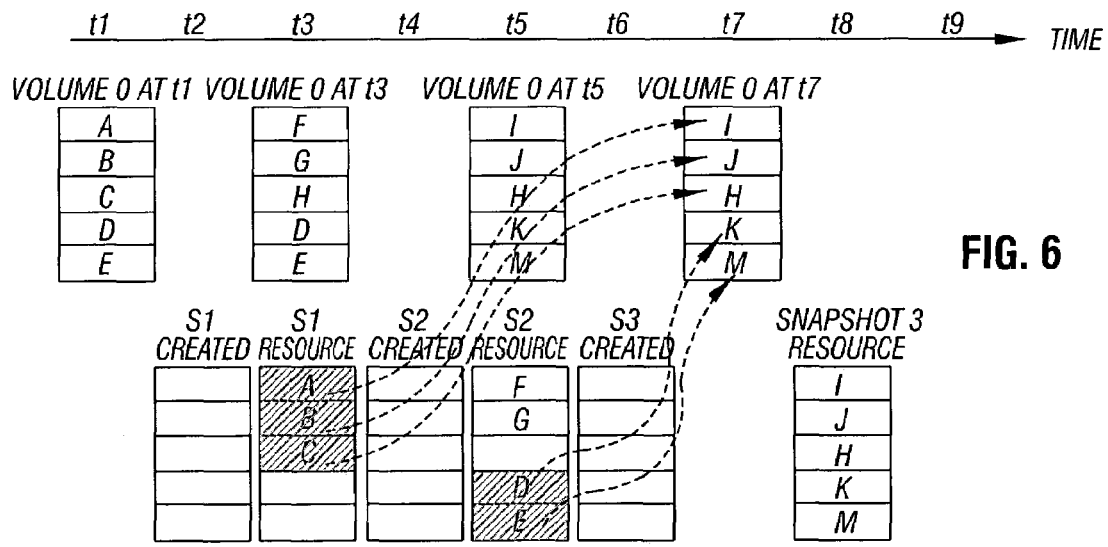
FIGS. 6-9 illustrate an example process of restoring from snapshots using a dual-direction restore option.
Figure 7:
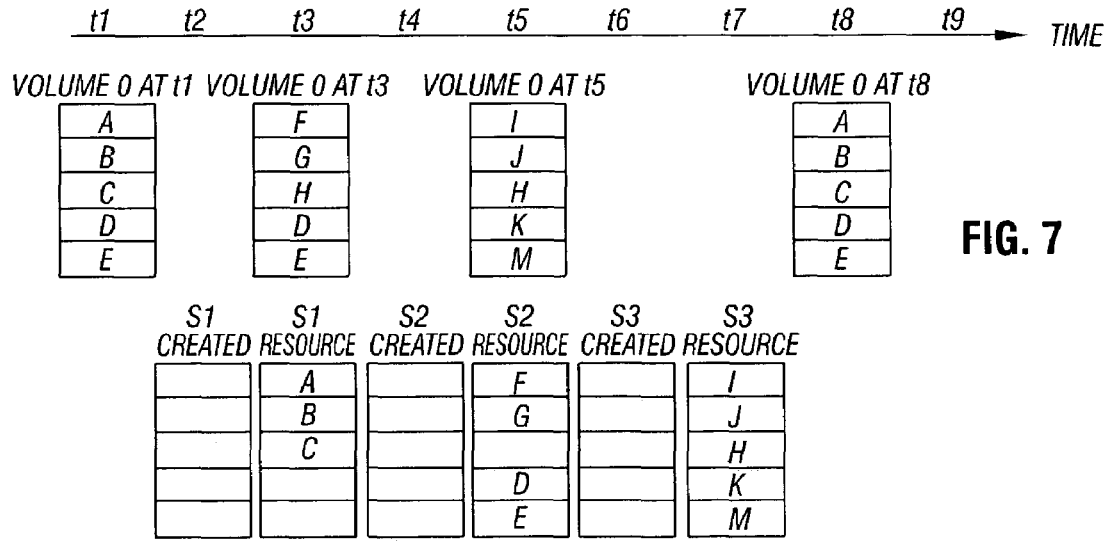

Next, as shown in FIG. 6, valid data from snapshots S1 and S2 (highlighted blocks) are restored back to volume 0. At the completion of the restore operation, at time t8, volume 0 contains blocks A, B, C, D, and E, while snapshot S3 contains blocks I, J, H, K, and M, which was the state of volume 0 prior to the restore operation (shown in FIG. 7).

Figure 8:
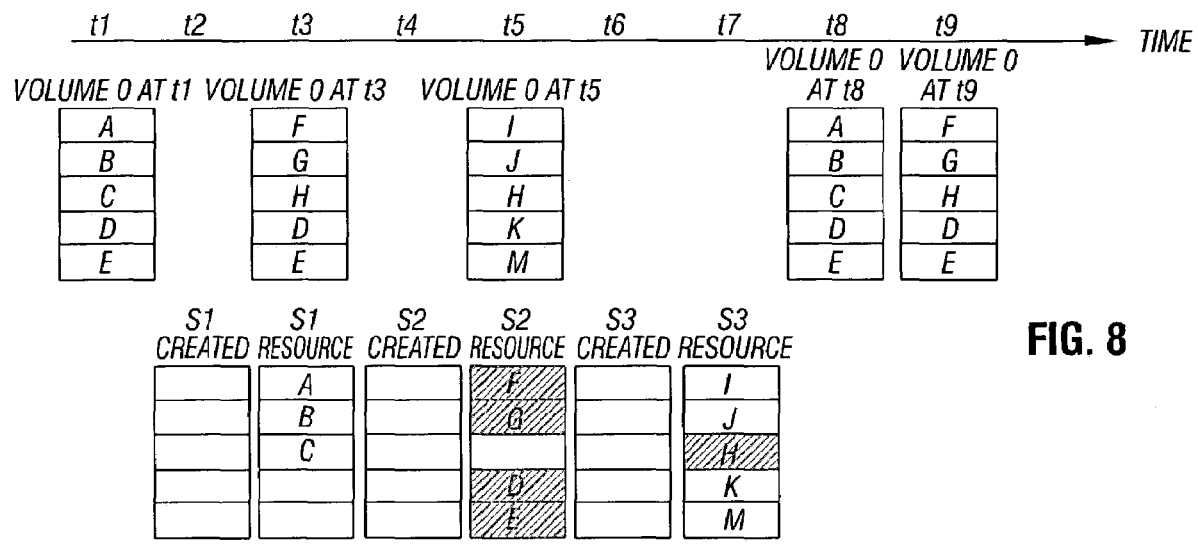

However, at this time, if the user determines that the restore from snapshot S1 does not provide the desired data, the user can then request that the restore be performed from snapshot S2. As shown in FIG. 8, in response to this request to restore from snapshot S2, the snapshot module 100 searches the snapshots to find valid data. In this example, the valid data includes blocks F, G, D, and E, from snapshot S2, and block H from snapshot S3 (indicated by the shaded blocks in FIG. 8). This second restore request from snapshot S2 does not cause another copy-on-write operation to be performed to copy data in volume 0 to a snapshot. That is because snapshot S3 already contains original data of volume prior to the first restore from snapshot S1. The valid data in snapshots S2 and S3 (F, G, H, D, E) are then restored back to volume 0 at time t9, as shown in FIG. 8.

Figure 9:
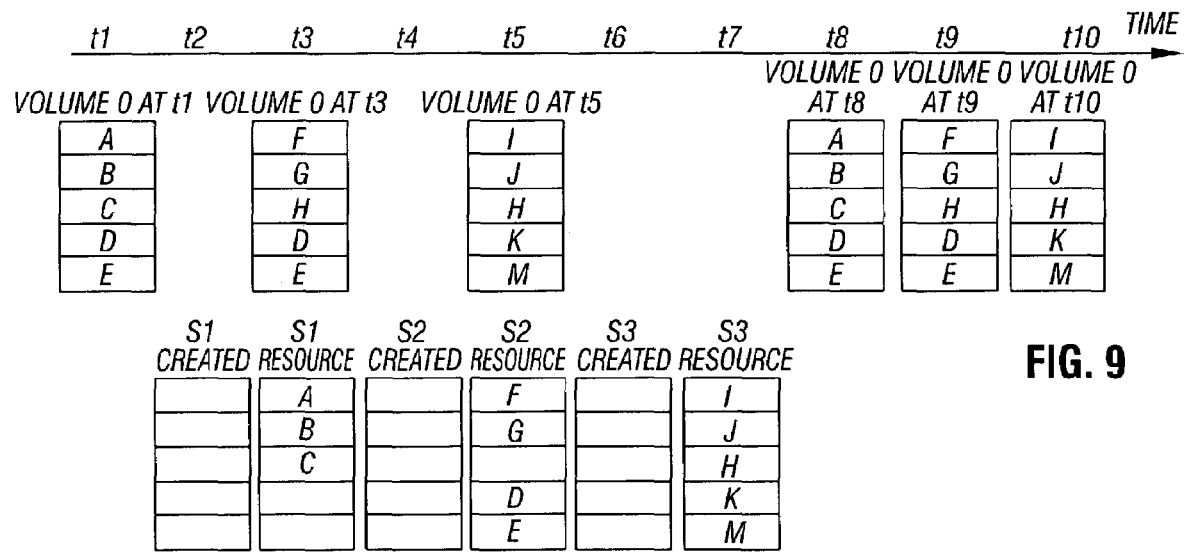

Now assume that the user determines that the restore from snapshot S2 is also undesirable, and thus wishes to go back to the state of volume 0 prior to the first restore operation (from snapshot S1). In other words, the user has changed his or her mind, and now no longer desires any restore to be performed. In this case, all valid data will be found in snapshot S3. The restore is then performed from data found in snapshot S3 back to volume 0, at time t10 (shown in FIG. 9).

As discussed above, by using the dual-direction restore option, the user is provided greater flexibility in undoing prior restores and choosing to restore from newer snapshots or undoing all restores altogether.

Figure 10:
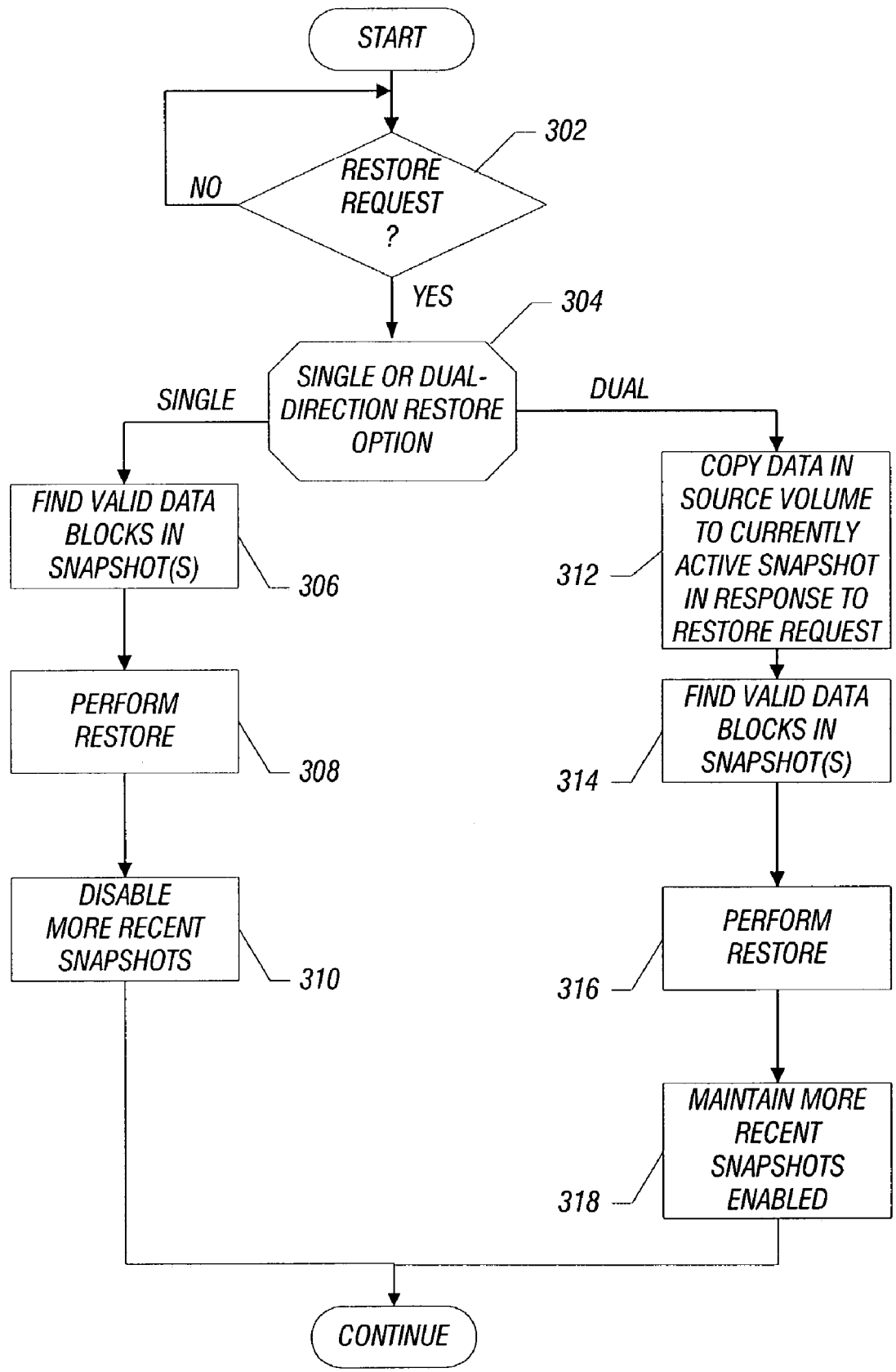
FIG. 10 is a flow diagram of a process of performing restores according to some embodiments.

FIG. 10 illustrates a process according to some embodiments of performing a restore from snapshots. In the system of FIG. 1, the process is performed by the storage controller 102 under the control of the snapshot module 100. In other embodiments, the process can be performed by other modules, whether software, hardware, or a combination of both. Also, the process of FIG. 10 can be performed by more than one module in the system. To be generic, the process of FIG. 10 is set to be performed by a "controller," where the "controller" can be a hardware component(s), a software component(s), or a combination of both.

The controller first determines if a restore request has been received (at 302). If so, the controller determines (at 304) if the single-direction restore option or the dual-direction restore option has been enabled. This can be performed by examining a flag or some other indicator in the system. If single-direction restore is enabled, the controller finds (at 306) valid data blocks in the appropriate snapshots. The controller then performs (at 308) a restore from the valid data blocks. Next, the controller disables (at 310) all snapshots that are more recent than the snapshot from which the restore is performed. The controller accomplishes this by updating indicators in the snapshot map 130 to disable the corresponding snapshots.

Alternatively, if dual-direction restore is enabled, the controller performs another copy-on-write operation by copying (at 312) data in the source volume to the currently active snapshot prior to performing the first restore. Next, the controller finds (at 314) all valid data blocks associated with the snapshot from which restore is to be performed. The restore is then performed (at 316). However, with the dual-direction restore option, the more recent snapshots are maintained enabled (at 318) in the snapshot map 130 so that restores from the more recent snapshots can be performed later.

Instructions of the various software or firmware modules discussed herein are stored on one or more storage devices and loaded for execution on a corresponding control unit or processor. The control unit or processor includes a microprocessor, a microcontroller, a processor module or subsystem (including one or more microprocessors or microcontrollers), or other control or computing devices.

Data and instructions (of the various software or firmware modules) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a system, comprising:
   storing plural point-in-time representations of data taken at plural respective time points from a storage unit;
   receiving a first request to restore data from a first one of the point-in-time representations;
   in response to the first request to restore but prior to performing the restore, storing data in the storage unit in a second point-in-time representation that is subsequent to the first point-in-time representation; and
   in response to the first request, restoring data into the storage unit from the first point-in-time representation and from at least a third point-in-time representation subsequent to the first point-in-time representation.

2. The method of claim 1, wherein storing the point-in-time representations of data taken from the storage unit comprises storing the point-in-time representations of data taken from a logical storage volume.

3. The method of claim 1, further comprising receiving a second request to restore data from the third point-in-time representation; and
   in response to the second request, restoring data into the storage unit from the third point-in-time representation.

4. The method of claim 1, further comprising restoring data into the storage unit from the second point-in-time representation to restore the storage unit back to a state prior to the restore that is performed in response to the first request.

5. The method of claim 1, further comprising storing other point-in-time representations taken at time points prior to the first one of the point-in-time representations.

6. The method of claim 1, further comprising:
   maintaining enabled point-in-time representations subsequent to the first one of the point-in-time representations.

7. The method of claim 6, wherein maintaining enabled point-in-time representations comprises maintaining corresponding indicators at an active state.

8. The method of claim 1, wherein storing the plural point-in-time representations comprises storing the plural point-in-time representations in a storage region of a storage subsystem separate from a region of the storage subsystem containing the storage unit.

9. The method of claim 8, further comprising storing information to identify locations of the point-in-time representations.

10. The method of claim 9, further comprising storing an indicator for each point-in-time representation to indicate whether the point-in-time representation is enabled or disabled.

11. An article comprising at least one storage medium containing instructions that when executed cause a system to:
    store plural point-in-time representations of data taken at respective time points from a storage unit;
    in response to a request to perform a restore from a first one of the point-in-time representations, copy data in the storage unit to a last one of the point-in-time representations but not to any other point-in-time representation earlier than the last point-in-time representation, and after copying the data to the last point-in-time representation, restore data from the first point-in-time representation to the storage unit; and
    maintain other point-in-time representations after the first point-in-time representation enabled to allow a subsequent restore of data from a second one of the point-in-time representations taken subsequently to the first one of the point-in-time representations.

12. The article of claim 11, wherein the instructions when executed cause the system to further:
    receive a second request to restore data from the second one of the point-in-time representations that is subsequent to the first one point-in-time representation; and
    in response to the second request, restore data into the storage unit from the second one of the point-in-time representations.

13. The article of claim 11, wherein the instructions when executed cause the system to further:
    store information to identify locations of the point-in-time representations, and to indicate whether each point-in-time representation is enabled or disabled.

14. A system comprising:
    a storage containing a storage unit, plural point-in-time representations of the storage unit, and an indicator; and
    a controller adapted to perform one of a single-direction restore and a dual-direction restore from the point-in-time representations based on a state of the indicator.

15. The system of claim 14, wherein the controller performs the single-direction restore by:
    restoring data from one of the point-in-time representations into the storage unit; and
    disabling point-in-time representations subsequent to the one point-in-time representation.

16. The system of claim 15, wherein the controller performs the single-direction restore by further:
    maintaining enabled point-in-time representations prior to the one point-in-time representation.

17. The system of claim 14, wherein the controller performs the dual-direction restore by:
    restoring data from one of the point-in-time representations into the storage unit; and
    maintaining enabled point-in-time representations subsequent to the one point-in-time representation.

18. The system of claim 17, wherein the controller performs the dual-direction restore by further:
    receiving a request to perform the restore from the one point-in-time representation; and
    in response to the request and prior to restoring data from the one point-in-time representation, copying data in the storage unit into a single point-in-time representation subsequent to the one point-in-time representation.

19. A controller for controlling a storage subsystem, comprising: a data access module to store data in a logical storage unit of the storage subsystem; and a snapshot module to:
    store plural snapshots of data taken at plural corresponding time points;
    receive a first request to restore data from one of the snapshots; and
    in response to the first request but prior to performing the restore, copy data in the logical storage unit to a currently active snapshot without copying data in the logical storage unit to one or more snapshots earlier than the currently active snapshot.

20. The controller of claim 19, wherein the currently active snapshot comprises a second snapshot subsequent to the one snapshot, the snapshot module to further:
- perform a first restore of data from the one snapshot in response to the first request; and
- in response to another request perform a second restore of data from the second snapshot to restore a state of the logical storage unit prior to the first restore.

21. A system comprising:
- means for storing plural snapshots of data in a storage unit taken at respective plural time points;
- means for receiving a request to restore from a first one of the snapshots;
- means, responsive to the request to restore from the first snapshot, for restoring data from the first snapshot and from at least one other snapshot subsequent to the first snapshot into the storage unit; and
- means for maintaining snapshots subsequent to the first snapshot enabled to allow a subsequent restore of data from a second one of the snapshots taken subsequently to the first snapshot.

22. The system of claim 21, further comprising means for storing indicators to indicate whether corresponding snapshots are enabled or disabled.

* * * * *

UNITED STATES PATENT AND TRADEMARK OFFICE
CERTIFICATE OF CORRECTION

PATENT NO.         : 7,231,544 B2
APPLICATION NO. : 10/376957
DATED              : June 12, 2007
INVENTOR(S)        : Choon-Seng Tan et al.

It is certified that error appears in the above-identified patent and that said Letters Patent is hereby corrected as shown below:

In column 7, line 16, in Claim 1, delete "staring" and insert -- storing --, therefor.

In column 9, line 6, in Claim 20, after "request" insert -- , --.

Signed and Sealed this

Third Day of February, 2009

JOHN DOLL
*Acting Director of the United States Patent and Trademark Office*